W. H. Taber,
Bench Plane.
N. 2274. Reissued June 5. 1866.
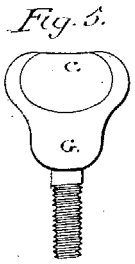
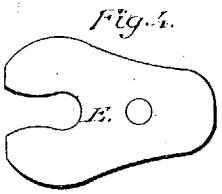
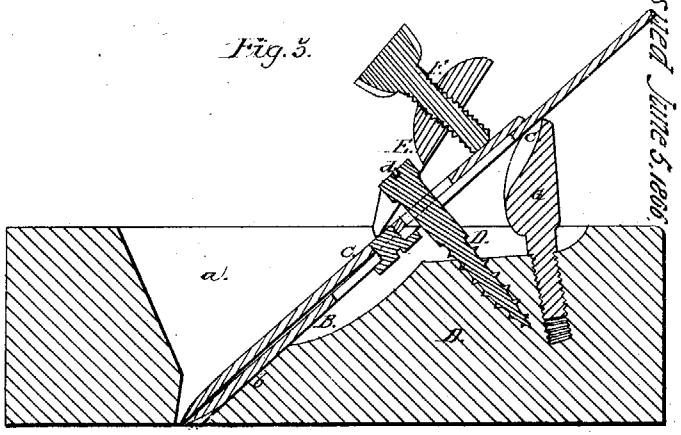
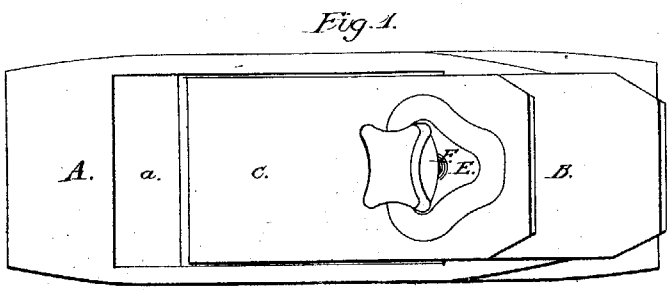
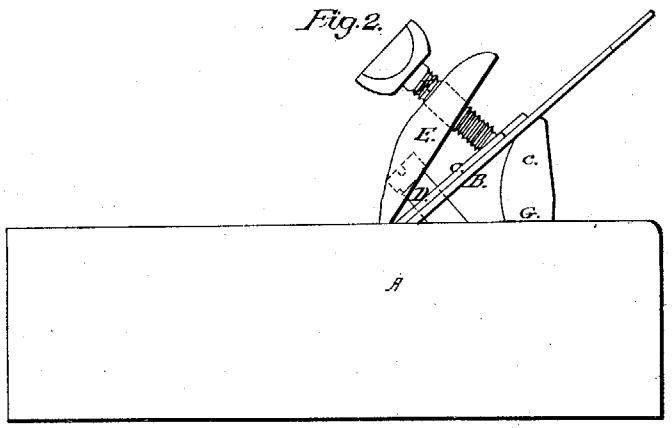
Witnesses:
Frederick Curtis,
F. P. Hale Jr.
Inventor:
W. H. Taber
by his attorney
R. H. Eddy
N. PETERS, PHOTO-LITHOGRAPHER, WASHINGTON, D. C.

UNITED STATES PATENT OFFICE.

WING H. TABER AND THOS. R. ABBOTT, OF LOWELL, MASSACHUSETTS, ASSIGNEES OF W. H. TABER.

IMPROVEMENT IN CARPENTERS' BENCH-PLANES.

Specification forming part of Letters Patent No. 46,614, dated February 28, 1865; Reissue No. 2,274, dated June 5, 1866.

*To all whom it may concern:*

Be it known that WING H. TABER, of Lowell, in the county of Middlesex and State of Massachusetts, has invented certain new and useful Improvements in Bench-Planes, of which the following is a full, clear, and exact description sufficient to enable those skilled in the art to practice the invention.

The invention relates to the construction of bench-planes, and particularly to the means employed for adjusting the edge of the cutter with respect to the face of the plane.

The cutter is so applied to the plane-stock that it rests or bears at its lower end against the stock at the throat, while at or near its upper end it rests upon a bed-piece projecting from the stock, and between these supporting-points is applied the mechanism that fastens the cutter to the stock, the arrangement of this mechanism being such that the cutter can be sprung or bent by it in such manner as to adjust the position of the cutting-edge of the plane with respect to the face of the plane, this adjustability being for the purpose of varying the degree of "cut" of the plane, as is readily understood. It is in this provision for adjustment by springing or bending the iron that the invention consists.

The drawings represent a plane embodying the invention, Figure 1 showing a plan, Fig. 2 a side elevation, and Fig. 3 a longitudinal vertical section, of it.

A denotes the stock; *a*, the throat extending through the same. B is the cutter; C, the cap.

The cutter rests at the lower end of the throat against the stock, as seen at *b*, Fig. 3, and at its upper part it rests upon a bed-pin or bearing, G. This bed is shown as applied to the stock by means of a screw cut upon its lower end, and by turning the screw more or less into the stock the cutter may be set at any desirable inclination. This bed G has a wide head, (as seen at Fig. 5, which is a front view of it,) so as to support the sides of the cutter. The cutter and cap are clamped together in the usual manner, and each has a slot, through which a screw-pin, D, projecting from the stock between the points of support of the iron passes, as seen in Fig. 3. This screw may have a wide head to screw directly down upon the iron (on opposite sides of the slot) to clamp the iron in position, or a wide washer may be interposed between the head and the plane-iron.

The cutter being supported against the stock at the throat, and upon the bed G at its upper end, and unsupported between these points, it will be obvious that after setting the plane in position, with its cutting-edge projecting from the face to the maximum of practical cut, and securing it in position by the screw-pin, the degree of cut may be adjusted by simply screwing the pin more or less tightly against the iron, thereby springing it and regulating the extent of the protrusion of its cutting-edge beyond the plane of the face of the stock.

This is the simplest method of carrying out the invention, and the drawings show a modification of this mechanism effecting the same purpose—namely, clamping the iron in position and springing it to adjust the cut. A forked lever, E, (which may have a form in plan as seen in Fig. 4,) slips at its lower end under the head *d* of the screw D, the points of the prongs bearing upon the upper surface of the ron. Through its upper end a screw, F, passes, as seen in Fig. 3. The points of the lever resting against the iron, the opposite inner edges of the prongs are made, by the action of the screw, to abut against the head of the screw, which head thus serves as a fulcrum, so that by rotation of the screw F the cutter is not only clamped in position by the lever, but is sprung or bent to vary the relation of the cutting-edge to the plane face, as before described, and as will be readily understood.

The bed G may be a fixture driven permanently into the stock, but when desirable, as it sometimes is, to alter the general inclination of the iron in accordance with the condition or nature of different materials to be planed, it is preferably made adjustable with respect to the stock, as shown.

The common method of clamping the cutter in position by means of a wedge and of adjusting the cutting-edge to the plane of the face of the stock with the hammer is too well known to require description, and the difficulty of readily obtaining the proper adjustment is as well known to all who use bench-planes, and to such the importance of this invention is readily understood, the cutter being capable of perfect and very expeditious adjustment by merely turning the clamp-screw and springing the iron into proper position. The cap-iron is preferably so adjusted with respect to the cutter that upon slipping the irons into the stock the abutting of the cap at the upper end of its slot against the screw D shall bring the cutting-edge of the iron into such position with respect to the stock-face that any and all practical or desirable changes in the pointing of the cutting-edge may be made by springing the iron, as before described.

What is claimed is—

1. The mechanism whereby the cutting-edge of the bit is adjusted with respect to the face of the plane by springing the iron upon its bed in the plane-stock, in the manner and by the means substantially as described.

2. Adjusting the inclination of the cutting-bit with respect to the face of the plane by means of the adjustable bed G, when used in combination with the clamping mechanism, substantially as described.

WING H. TABER,
T. R. ABBOTT.

Witnesses:
J. B. CROSBY,
F. GOULD.